United States Patent Office 3,318,704
Patented May 9, 1967

3,318,704
COMPOSITIONS WITH FATTY OIL AND
SAFFLOWER PHOSPHATIDE
Joseph Eichberg, Atlanta, Ga., assignor to American Lecithin Company, Atlanta, Ga., a corporation of Georgia
No Drawing. Filed Oct. 22, 1965, Ser. No. 502,524
13 Claims. (Cl. 99—15)

This application is a continuation-in-part of copending application Ser. No. 290,310, filed June 25, 1963, now abandoned.

This invention relates to novel emulsifiable fatty oil compositions and to emulsions and dispersions prepared therefrom. More particularly, the invention concerns fatty oil compositions and emulsions containing safflower phosphatide.

The term fatty oil as employed herein, refers to oils and fats, both animal and vegetable, saturated and unsaturated, plain and hydrogenated.

Lecithin and associated phosphatides derived from soybeans, available commercially under the designation lecithin, has been employed for many years as a wetting agent and dispersing agent for finely divided solids in fatty oils, and as an emulsifying agent for the fatty oils themselves. Typical of such applications of lecithin is its use in food products such as chocolate or biscuit fillings, or in industrial products such as oleoresinous paints. It has also been suggested to employ vegetable phosphatides derived from corn and cottonseed oils on the theory that these contain no fatty acid radicals of higher unsaturation than linoleic acid, in contrast to soybean phosphatides, and that improved stability thereby results. However, the stability of fatty oil type emulsions employing either soybean lecithin or other previously suggested emulsifying agents, particularly in the presence of appreciable amounts of moisture, has not been sufficiently dependable to meet the higher standards now being set in many of the consuming industries.

In accordance with the present invention, it has been found that fatty oil emulsions and dispersions of greatly improved stability, water retentiveness, and having superior emulsifying properties are obtained by incorporating with a fatty oil from about 0.1% to about 5.0% by weight of the fatty oil, of safflower phosphatide. The latter term refers to lecithin and associated phosphatides derived from safflower.

It has been found, in accordance with the invention, that an oil or fat containing the safflower phosphatide is more stable at relatively high temperatures and does not develop objectionable darkening as readily as the same oil or fat containing soybean phosphatide, and moreover, the flavor of products prepared with safflower phosphatide is more satisfactory.

It has been further found, in accordance with the invention, that the aforementioned improved properties imparted by the safflower phosphatides become more pronounced in the case of fatty oil compositions which contain an appreciable amount of moisture, preferably not less than about 1% of moisture by weight, of the fatty oil. The reason for this unexpected and surprising moisture effect in improving the properties of the composition is not fully understood, but it is known that when lecithin and associated phosphatides come into contact with water peculiar fingerlike growths, known as myelin forms, result. These irregular growths on the surface occur because of the surface area occupied by the phosphatide and the interaction between the phosphate and the base parts of the molecule, and the water.

In accordance with the invention, it has been found that in the case of safflower phosphatides, in contrast to soybean or corn phosphatides, the colloidal dispersion in water or as myelin forms is not inhibited or disrupted by the presence of calcium ions. Although not wishing to be bound by any particular theory, it is believed that the unexpected affinity for moisture of the safflower phosphatides which is utilized in the invention is attributable to the bonding and natural stabilizing of the commercial safflower phosphatide by minor constituents present, principally the sterols, carbohydrate and inorganic substances.

In such complexing, the bonds or bridges, most likely of an electrostatic nature, are more resistant to disruption by the divalent calcium ions, with the positive and negative charges opposed, substantially stronger than in soy or corn phosphatides, or else such bridges may be more numerous in the case of safflower phosphatides.

This is borne out by fractionation studies in which, surprisingly and unexpectedly, 25% of the acetone-purified safflower phosphatides was found to be insoluble in equal parts of cold chloroform-methanol. When the solvent was removed from this insoluble residue and water was added, and the soluble material was subjected to paper electrophoresis in an effort to separate any charged water-soluble esters, only about 25% of the phosphorus in the original sample could be recovered from the paper, and nearly all of it was at the starting point. This indicates either that it was not charged or that it was bound to a cation such as calcium or magnesium, so that its charge was neutralized.

In accordance with a further aspect of the invention, it was found that, in the presence of moisture, the fatty oil compositions are better emulsified with safflower phosphatide at a pH below about 6.0. This is in contrast to soybean phosphatides which diminish in effectiveness as pH is reduced. This improved emulsifying power is not affected by the presence of mineral salts, such as those of alkali metals or alkaline earth metals. The safflower phosphatides exhibit a surprisingly greater affinity for moisture than do soybean phosphatides. On the other hand, a fatty material, such as cocoa butter, containing safflower phosphatide, crystallizes more readily and more uniformly.

The safflower phosphatides impart to the fatty oil compositions of the invention improved water retention and absorption and they exhibit superior emulsifying properties.

Compositions of the type contemplated within the scope of the invention, and which contain at least about 1% by weight of moisture include, for example, margarine, batters or doughs for baking, fat-containing candies, ice cream, salad dressings, emulsions or treating materials for use in the production of leather or textiles, emulsion-type paints, cosmetic and medicinal preparations, and the like. The advantage of the safflower phosphatide is observed even where there are relatively high percentages of moisture in contact with the fatty oil or fatty oil containing substances, for example, instant beverage powders, such as cocoa powder, to be admixed with water or milk.

The following examples serve to illustrate the practice of the invention, but are not to be considered as limiting:

*Example 1*

7 grams of safflower phosphatides substantially free from moisture and a carrier of about 30% of vegetable oil were emulsified with 3 grams of water and the hydrated material was allowed to stand overnight. A comparison sample of the same composition using commercial soybean phosphatides instead of safflower phosphatides was prepared in the same way. The respective samples were placed in a drying oven at 105° C. and were examined after 30 minutes. It was found that the safflower phosphatide sample had lost 1.1390 grams of water, while the soybean phosphatide sample had lost 1.3980 grams of water. After 60 minutes drying time, the safflower phosphatide had lost 2.8729 grams of moisture while the soybean phosphatide had lost 3.0454. This demonstrates the improved moisture affinity and retention attributable to the safflower phosphatides.

*Example 2*

Portions of soybean lecithin and of safflower phosphatide (containing a vegetable oil carrier) were admixed respectively with molten cocoa butter in amounts of 0.30% by weight. Setting point determinations were made. The soybean phosphatide sample set at 21.5° C., while that with safflower phosphatide set at 24.2° C. Moreover, when molten cocoa butter containing the foregoing percentages, respectively, of these phosphatides at 140° F. was poured into crystallizing dishes, it was observed that the sample with safflower phosphatides started to crystallize first and exhibited a more uniform condition after setting or standing overnight.

*Example 3*

A dietetic beverage was prepared in two samples as follows: (1) to a Waring Blendor were added 125 ml. tap water, 15 gm. skim milk solids containing 3 gm. commercial soybean lecithin, 40 gm. safflower oil, and the ingredients were mixed for exactly 1 minute. Another 250 ml. tap water was added together with 30 gm. skim milk solids and the ingredients mixed for exactly 3 minutes. (2) The first experiment was repeated using safflower lecithin (phosphatides) in place of the soybean lecithin.

The composition with soybean lecithin showed oil separation on standing for less than 1 hour. After standing for 2 days at room temperature, the mixture had soured with considerable coagulation. All the oil had risen to the surface. On the afternoon of the third day, the sample containing safflower lecithin was milky white, had a faint sour odor and showed a slight trace of oil separation. Slight surface coagulation had occurred. It was noted that the foam broke very rapidly after mixing the safflower phosphatide containing emulsion, whereas the foam of the soybean lecithin containing composition required several hours to break. The soybean lecithin emulsion was not milky white. This demonstrates the superior emulsifying properties of the safflower phosphatide since there was only a slight trace of oil separation on standing for 3 days and the emulsion was milky white, whereas the emulsion with soybean phosphatides showed oil separation after standing for less than one hour and at no time achieved a milky white appearance. The safflower phosphatide emulsion also exhibited much better resistance to development of a sour odor and much less tendency to show any coagulation on prolonged standing.

*Example 4*

Another emulsion test was made by dissolving respectively 1.5 gm. of commercial soybean phosphatides and 1.5 gm. safflower phosphatides in 40 ml. portions of cotton seed oil. These solutions were added to 375 ml. water containing 45 gm. skim milk solids, and each preparation was transferred to a Waring Blendor and agitated for 1 minute. Good emulsions were obtained in each case, but on standing overnight there was appreciable oil separation from the soybean phosphatide sample, but no oil separation took place with the safflower phosphatide sample.

*Example 5*

Two samples of coconut oil were prepared, one containing 2% of soybean phosphatides and the other 2% by weight of safflower phosphatides. One drop of each sample was placed on wet paper and the diameter of the globule measured after exactly 60 seconds. The drop of coconut oil containing soybean phosphatides had a diameter of $7/16''$, whereas the sample containing safflower phosphatides had a diameter of $9/16''$, illustrating the improved spreading power of the safflower phosphatide, and its lowering of oil-water interfacial tension.

*Example 6*

In the production of baked goods containing fatty oil, it is often the practice to use a hydrogenated shortening and to cream this during the mixing operation so that moisture is incorporated into the shortening. The moisture in finely divided form contributes to the quality and shelf life of the finished baked goods. To plain hydrogenated shortening there was added 5% by weight of commercial soybean phosphatide. The shortening was placed in a Hobart mixer and beaten with a wire whip at creaming speed while water was added slowly. The sample absorbed 80% water. A similar sample was prepared using 5% by weight of safflower phosphatides. This sample absorbed 125% of water, demonstrating the superior emulsifying properties of the safflower phosphatides.

*Example 7*

The comparative darkening effect of safflower and soybean phosphatides on a vegetable oil was shown by preparing 2 samples of cottonseed oil, each containing respectively 1% by weight of these phosphatides. Upon heating above 300° F. the sample of oil containing safflower phosphatide was more resistant to darkening.

*Example 8*

Water dispersions of 2% safflower phosphatides and 2% soybean phosphatide, by weight, were prepared. The safflower phosphatide dispersed or emulsified more readily and was more resistant to precipitation in the presence of salts or when the pH was substantially lowered by addition of acid.

*Example 9*

Samples of a salad dressing composition were prepared using salad oil and vinegar and 5% by weight of phosphatide based on the weight of the oil, in the form of hydrate containing 50% water. The samples prepared with the safflower phosphatides produced a heavier, more acceptable consistency than could be obtained with the soybean phosphatide. Under varying conditions of emulsification, the safflower phosphatide was more resistant to curdling than the soybean phosphatide.

*Example 10*

In the manufacture of margarine, the safflower phosphatide is not only more effective than the soybean phosphatide but permits a reduction in the amount of mono- and diglycerides which are customarily employed in margarine along with the lecithin. Thus, a margarine made with 0.15% by weight of the safflower phosphatide and 0.10% of mono- and diglyceride was found to be superior on the basis of taste and frying performance to the same margarine made with 0.2% soybean phosphatides and 0.3% of mono- and diglycerides (which contained approximately 42% of mono ester).

*Example 11*

The superior wetting power of safflower phosphatides and their applicability in the food industry where many dry or powdery ingredients contain varying amounts of fatty oil and are to be mixed with water or water-containing substances, is illustrated in the case of cocoa powder. A test was made by adding and dispersing 1% of soybean and safflower phosphatide respectively in water and diluting so that the water contained 0.3% phosphatide. Cocoa powder (containing about 14% fat) was then dropped in small quantity onto the surface of the liquid. When safflower phosphatide was used, the powder was completely wetted in 26 seconds, whereas with soybean phosphatide the complete wetting of the cocoa powder required 45.6 seconds.

Commercial lecithin or phosphatide, which usually consists of about 65% phosphatide and 35% oil carrier and includes small amounts of moisture and minor constituents, the oil varying according to the vegetable source as does the phosphatide, is generally produced by adding moisture to the crude oil which contains the phosphatides, as pressed or extracted from the vegetable source, such as vegetable seeds, allowing the phosphatides to hydrate and then centrifuging to separate the wet phosphatide complex from the oil and drying the phosphatide emulsion as separated, including a proportion of the oil and the minor constituents, under vacuum.

In referring to safflower phosphatide and to other phosphatides as the case may be, I mean the phosphatide complex consisting of the lecithin and associated phosphatides and the naturally associated minor constituents separated from the crude oil in the production of the phosphatide product.

I have compared commercial safflower phosphatide with the commercial phosphatide derived from corn oil and find the two materials to be different and to perform differently and the safflower phosphatide to be superior to the corn phosphatide in various applications. This is illustrated by the following example:

Example 12

1.5 grams of commercial oil-containing safflower phosphatide was dissolved in 40 cc. of cottonseed oil and there was then added 375 cc. of water containing 45 grams of non-fat milk solids. The mixture was emulsified for one minute in a Waring Blendor and an excellent emulsion of very white appearance was obtained. When the same procedure was carried out using commercial corn oil phosphatides in place of the safflower phosphatide the emulsion was noticeably darker or yellower in color and significantly less satisfactory.

Furthermore, I have found that emulsions of safflower phosphatide in water are more stable than similar emulsions made with corn phosphatide and are more resistant to precipitation or coagulation by divalent calcium ions, such as when calcium chloride is added, making the safflower phosphatide more useful as emulsifiers and stabilizers.

Thus, for example, a 5% dispersion of safflower phosphatides (5.0 cc.) was not coagulated after addition of 5.0 cc. of 10% calcium chloride, whereas a 5% dispersion of soybean phosphatides (5.0 cc.) was completely flocculated by 0.10 cc. of 10% calcium chloride.

While safflower phosphatide like corn phosphatide does not contain linolenic acid I do not find that safflower phosphatide exhibits characteristics ascribed to linolenic acid free corn phosphatide in U.S. Patent No. 2,201,064 or other literature relating to corn phosphatide, according to which it is more stable and more resistant to oxidation than soybean phosphatide. On the contrary, I have found that safflower phosphatide is less resistant to oxidation and that surprisingly I am able to improve its stability by mixing with it a proportion of soybean phosphatide, which contains linolenic acid, in an amount from 5% up to 50%. In this way I can, for example, incorporate the phosphatide in powdered or granulated sucrose. When using 4% of the safflower phosphatide, containing no linolenic acid, triturated or otherwise blended with the sugar, I find that the composition becomes rancid in about ten days, whereas the same product made with soybean phosphatide which contains linolenic acid does not become rancid even when stored for months. When I add small amounts, up to about an equal amount of soybean phosphatide to the safflower phosphatide, I obtain improved keeping properties approaching those obtained in the case of the soybean phosphatide alone admixed with the sugar.

Contrasted to corn phosphatides I observe that the commercial safflower phosphatide does not dissolve as completely in hexane solvent and that a higher proportion of the safflower phosphatide is insoluble in the methanol-chloroform solvent mixture, 1 to 1 by volume. The significant differences between the corn phosphatides and the safflower phosphatides are due in part as previously indicated to minor constituents, including the type of sterol compounds or complexes present, and in this connection it is surprising that the safflower phosphatide exhibits superior emulsifying performance since it contains considerably less sterol material than either corn phosphatide or soybean phosphatide. I believe this is due to a special type of protein containing sterol complex in the safflower phosphatide.

Whereas the commercial corn phosphatide of Patent No. 2,201,064 is said to be predominantly the cephalin type, the naturally derived safflower phosphatide complex of the present invention contains only a minor proportion of the cephalin type phosphatide, phosphatidyl ethanolamine, and in addition contains substantial amounts of lecithin as such, phosphatidyl choline, and of inositol phosphatides along with the minor constituents of non-phosphatide nature.

In accordance with the broadest aspect of my invention, I have found that a phosphatide rich in linoleic acid and substantially free of linolenic acid will impart to fatty oil containing materials qualities of improved stability, dispersibility and water absorption. Safflower phosphatides serve to illustrate this broad principle of the invention. In accordance with this principle the invention has within its contemplation admixtures of safflower phosphatide and other phosphatides. Thus, I have found that safflower phosphatide having incorporated therein from about 5% to about 50% by weight of soybean phosphatide is adapted for inclusion in fatty oil containing materials to improve their properties.

The fact that safflower phosphatide does not exhibit better oxidative stability than soybean phosphatide, as described in the literature for corn lecithin, in spite of the fact that the safflower phosphatide like the corn phosphatide is free of the more highly unsaturated linolenic fatty acid, and the fact that the safflower phosphatide performs in a distinctive way is due, I believe, in part to the fact that it is unique in being at once substantially free of linolenic acid while at the same time containing a relatively high content of linoleic acid. Indeed I find that the linoleic acid may account for 55% or more of the fatty acids in the safflower phosphatide complex. Soy phosphatides while containing about 50% linoleic acid also contain linolenic acid in significant amount whereas corn phosphatide which contains no or substantially no linolenic acid contains only about 35% linoleic acid.

Further examples of the superior performance of the safflower phosphatide are as follows:

Example 13

Ice cream was made using 0.5% of phosphatide as the emulsifier and the safflower phosphatide was significantly better than soy phosphatide in giving ice cream of stiff body and excellent texture.

Example 14

In cake baking tests safflower phosphatide outperformed soy phosphatide, corn phosphatide and a soy phosphatide made more hydrophilic by hydroxylation. These tests were carried out using 3% of the phosphatide based on the shortening present in a white cake made with 40% more sugar than flour, sometimes referred to a 140% high ratio cake which is believed to be very critical in its demands on the emulsifier used. Beside the effects on volume and texture it was noted that the safflower phosphatide was more effective in reducing the tendency toward curdling which is encountered under these critical conditions.

What is claimed is:

1. A fatty oil composition containing as an additive between about 0.1% and about 5.0% by weight of the fatty oil of safflower phosphatide.

2. A fatty oil composition containing as an additive between about 0.1% and about 5.0% by weight of the fatty oil of safflower phosphatide, and containing not less than about 1% by weight of water.

3. A fatty oil containing material in the form of an aqueous dispersion, said material constituting the dispersed phase and having incorporated therein between about 0.1% and about 5.0% by weight of the fatty oil of safflower phosphatide.

4. The composition of claim 2 in which the fatty oil composition is a food product.

5. An aqueous emulsion comprising a fatty oil composition and having incorporated therein between about 0.1% and about 5.0% by weight of the fatty oil of safflower phosphatide, said emulsion having a pH below about 6.0.

6. A fatty oil composition containing as an additive between about 0.1% and about 5.0% by weight of the fatty oil of a phosphatide rich in linoleic acid and substantially free of linolenic acid.

7. The composition of claim 1 in which the safflower phosphatide has incorporated therein between about 5% and about 50% by weight of soybean phosphatide.

8. Safflower phosphatide having incorporated therein between about 5% and about 50% by weight of soybean phosphatide.

9. The composition of claim 2 in which the safflower phosphatide has incorporated therein between about 5% and about 50% by weight of soybean phosphatide.

10. A composition comprising a fatty oil and containing as an additive between about 0.1% and about 5.0% by weight of the fatty oil of phosphatide containing at least 50% of linoleic acid and substantially free of linolenic acid.

11. A composition comprising a fatty oil and containing as an additive between about 0.1% and about 5.0% by weight of the fatty oil of phosphatide rich in linoleic acid and substantially free of linolenic acid, and not less than about 1% by weight of water.

12. An aqueous emulsion comprising a fatty oil and having incorporated therein between about 0.1% and about 5.0% by weight of the fatty oil of safflower phosphatide.

13. A food product including a fatty oil and containing as an additive between about 0.1% and about 5.0% by weight of the fatty oil of safflower phosphatide.

References Cited by the Examiner
UNITED STATES PATENTS

| | | | |
|---|---|---|---|
| 2,201,064 | 5/1940 | Thurman | 99—15 |
| 2,667,499 | 1/1954 | Christensen | 260—412.2 |

OTHER REFERENCES

Bailey, A. E.: "Industrial Oil and Fat Products," 1951, Interscience Publ. Inc., New York, page 163.

A. LOUIS MONACELL, *Primary Examiner.*

M. W. GREENSTEIN, *Assistant Examiner.*